(12) United States Patent
Girard et al.

(10) Patent No.: US 11,001,459 B2
(45) Date of Patent: May 11, 2021

(54) LOADING OF SOLID PARTICLES INTO A VESSEL

(71) Applicant: PETROVAL, Saint Romain de Colbosc (FR)

(72) Inventors: Olivier Girard, Abjat Sur Bandiat (FR); François Guerrand, Le Havre (FR); Adriaan Stander, Fontenay (FR); Giuseppe Galassini, Marino Rome (IT)

(73) Assignee: Petroval, Saint Romain de Colbosc (FR)

( * ) Notice: Subject to any disclaimer, the term of this patent is extended or adjusted under 35 U.S.C. 154(b) by 0 days.

(21) Appl. No.: 16/734,056

(22) Filed: Jan. 3, 2020

(65) Prior Publication Data
US 2020/0216274 A1    Jul. 9, 2020

(30) Foreign Application Priority Data

Jan. 4, 2019 (FR) ........................................ 1900051

(51) Int. Cl.
*B65G 65/48* (2006.01)
(52) U.S. Cl.
CPC ..... *B65G 65/4863* (2013.01); *B65G 65/4845* (2013.01)
(58) Field of Classification Search
CPC .. B65G 65/4863; B65G 65/4845; B01J 8/002; B01J 8/003; B01J 2208/00752; B01J 2208/00778
USPC ................ 141/286, 387, 287, 302; 414/301; 222/189.02
See application file for complete search history.

(56) References Cited

U.S. PATENT DOCUMENTS

| | | | | |
|---|---|---|---|---|
| 364,059 A * | 5/1887 | Stauffert | ............... | B01F 13/002 366/285 |
| 655,552 A | 8/1900 | Gorton | | |
| 1,056,960 A * | 3/1913 | Murray | ................... | G07F 11/10 221/274 |
| 2,097,914 A * | 11/1937 | Cooper | ..................... | C10L 9/10 118/303 |
| 2,818,199 A * | 12/1957 | Fain | .......................... | B01J 8/002 222/189.02 |
| 2,932,494 A * | 4/1960 | Wales | .................... | A47J 43/044 416/3 |

(Continued)

FOREIGN PATENT DOCUMENTS

| | | |
|---|---|---|
| EP | 0166246 A1 | 8/1984 |
| FR | 2872497 A1 | 1/2006 |

(Continued)

*Primary Examiner* — Timothy L Maust
*Assistant Examiner* — James R Hakomaki
(74) *Attorney, Agent, or Firm* — Hahn Loeser & Parks LLP; Bret A. Hrivnak

(57) ABSTRACT

A device (20) for distribution of solid particles (22) for loading a vessel with solid particles, comprising a solid particles feed hopper (21), a rotating member and a drive member for driving in rotation said rotating member about a rotation axis, and a set of at least one deflector element (25, 25', 25") carried by said rotating member and erected, or adapted to be erected, on rotation of the shaft, relative to the rotation axis, in which device the feed hopper defines a set of at least one opening (29) conformed in an asymmetric manner relative to the rotation axis, defining at most one plane of symmetry passing through the rotation axis.

14 Claims, 6 Drawing Sheets

(56) References Cited

U.S. PATENT DOCUMENTS

| | | | |
|---|---|---|---|
| 3,332,669 A * | 7/1967 | Colonna | B01F 11/0082 366/258 |
| 3,361,258 A * | 1/1968 | Kalke | B65G 69/0458 209/234 |
| 3,559,962 A * | 2/1971 | Enssle | B01F 7/00066 366/308 |
| 3,880,300 A * | 4/1975 | Uhl | B01J 37/0215 422/219 |
| 3,972,567 A * | 8/1976 | Uhl | B01J 8/0015 406/181 |
| 4,040,529 A | 8/1977 | Wurdeman et al. | |
| 4,083,462 A * | 4/1978 | Teske | B65G 65/4836 414/307 |
| 4,306,829 A | 12/1981 | Loutaty et al. | |
| 4,342,532 A | 8/1982 | Voegele | |
| 4,437,613 A | 3/1984 | Olson | |
| 4,564,328 A | 1/1986 | Loutaty et al. | |
| 4,944,600 A * | 7/1990 | McKelvey | B01F 7/00208 366/142 |
| 5,192,132 A * | 3/1993 | Pelensky | B01J 8/003 136/230 |
| 5,282,681 A * | 2/1994 | Supelak | B01F 7/00733 366/244 |
| 5,324,159 A * | 6/1994 | Nowobilski | B01D 53/0423 414/301 |
| 5,372,467 A | 12/1994 | Harris | |
| 5,758,699 A | 6/1998 | Haquet et al. | |
| 5,899,248 A * | 5/1999 | Anderson | A47K 5/10 141/358 |
| 5,906,229 A | 5/1999 | Haquet et al. | |
| 6,443,193 B1 * | 9/2002 | Blasco | B65G 69/0458 141/286 |
| 6,805,171 B2 | 10/2004 | Crespin et al. | |
| 6,964,511 B2 * | 11/2005 | Rumph | B01F 3/1221 366/261 |
| 7,578,611 B2 * | 8/2009 | Hamilton | B01F 15/00954 366/129 |
| 8,376,682 B2 * | 2/2013 | Anderson | B65G 65/44 414/311 |
| 8,910,676 B2 | 12/2014 | Collard et al. | |
| 9,604,183 B2 * | 3/2017 | Dinnison | B01F 7/00058 |
| 9,963,293 B2 * | 5/2018 | Pleima | A01F 25/2018 |
| 10,029,225 B2 * | 7/2018 | Mairesse | B01J 8/003 |
| 2003/0156492 A1 | 8/2003 | Rumph | |
| 2005/0088907 A1 * | 4/2005 | Vanek | B01F 7/00341 366/129 |
| 2007/0297880 A1 | 12/2007 | Pinon et al. | |
| 2010/0149908 A1 * | 6/2010 | Singh | B01F 15/065 366/276 |
| 2012/0205007 A1 | 8/2012 | Girard et al. | |
| 2014/0305970 A1 * | 10/2014 | Musumeci | B65D 33/04 222/228 |
| 2015/0336063 A1 | 11/2015 | Mairesse et al. | |
| 2016/0067664 A1 | 3/2016 | Mairesse et al. | |
| 2019/0030505 A1 | 1/2019 | Cota | |

FOREIGN PATENT DOCUMENTS

| | | |
|---|---|---|
| FR | 2949755 A1 | 3/2011 |
| WO | 2010076522 A1 | 7/2010 |
| WO | 2017129689 A1 | 8/2017 |

* cited by examiner

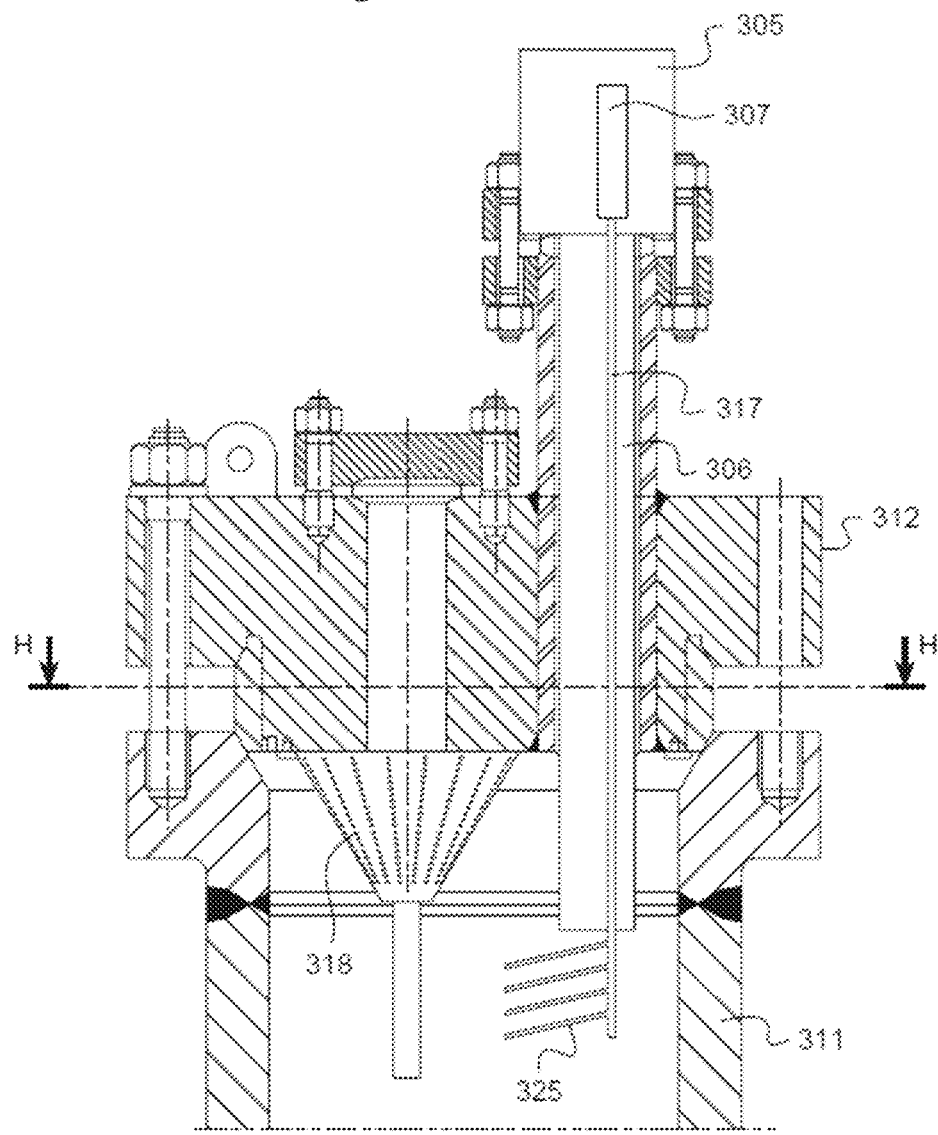

LOADING OF SOLID PARTICLES INTO A VESSEL

CROSS-REFERENCE TO RELATED APPLICATIONS

This application claims priority to, and the benefit of, French application no. 1900051, filed Jan. 4, 2019 with the Institut National de la Propriété Industrielle (French patent office), which is hereby incorporated by reference.

BACKGROUND

The invention concerns the distribution of solid particles into a vessel, and in particular into a reactor.

It is known to load reactors, in particular of chemical, electrochemical, petroleum or petrochemical type, with solid particles in the divided state. These particles may for example take the form of balls, grains, cylinders, pastilles, batons or any other shape and generally have relatively small dimensions.

The particles may in particular be grains of solid catalysts, generally extruded and produced either with a regular shape or in the shape of single-lobe or multilobe batons, the dimensions of which may vary with circumstances from a few tenths of a millimeter to a few centimeters.

The aim is to load a large number of solid particles homogeneously and as uniformly as possible into a restricted space in a short time period.

It is this application, termed "dense loading", of grains of catalysts into a chemical reactor that will be more particularly referred to in the remainder of the present description. By "dense loading" is meant here loading by a rainfall effect effected so as to reconcile restricted space, short loading time, high density, homogeneity and uniformity.

However, the device described may more generally find applications in the context of loading solid particles into a reactor or other vessel.

Several methods and devices enabling the density of a fixed bed of particles of catalyst in a chemical reactor to be increased are already known.

Document WO 2010/076522 (Cottard et al.) may for example be cited. The device described, comprising a rotating shaft and deflector elements, is advantageous in the sense that it can be introduced into the reactor via an orifice of relatively small section, the semi-rigid deflector elements then being erected upon rotation of the rotating member.

Devices of the type described in the document WO 2010/076522 have in common the introduction of particles to be loaded via the top of the reactor and collision of the individual particles, as they fall, with mechanical deflectors, causing a random deviation of said particles. The particles deviated in this way from falling vertically then ideally fall individually and freely with a rainfall effect onto the whole of the surface of the filling front, where they form a dense and homogeneous deposit.

The distribution device is conventionally installed in a filling opening of the reactor situated at the top of the reactor and at the center of the reactor, which can prove problematic for other operations.

For example, one or more measuring probes (or sensors) may be disposed inside the reactor in order to measure the level of the solid particles already fallen into the reactor, in particular during filling. More generally, probes are installed inside the reactor in order to measure parameters relating to monitoring the loading of the solid particles into the vessel.

The installation in the reactor of this kind of distribution system, including in particular the distribution device and the probe supports, can nevertheless prove relatively difficult to carry out. One of the main constraints with which operators of this type of equipment may be confronted is linked to the sometimes extreme internal overall size of a reactor that may contain plates, thermocouples and supports for those elements. This constraint is therefore linked to the small space available to operators for maneuvering the distribution device in order to install and adjust it.

There therefore exists a need for a system for loading solid particles that has less severe constraints in terms of overall size.

SUMMARY

There is proposed a device for distribution of solid particles for loading a vessel, for example a reactor, with solid particles, comprising:
  a solid particle feed hopper defining a set of at least one opening for evacuation of particles from the hopper by gravity,
  a rotating member and a drive member coupled to said rotating member to drive said rotating member in rotation about a rotation axis having a direction with a component in the direction of the gravity vector, for example a rotation axis parallel to the gravity vector,
  downstream of the set of at least one opening of the feed hopper a set of at least one deflector element carried by said rotating member erected relative to the rotation axis or adapted to be erected relative to the rotation axis.

According to the invention the set of at least one opening in the feed hopper is conformed in an asymmetric manner relative to the rotation axis, defining at most one plane of symmetry passing through the rotation axis.

This set of at least one opening may be conformed so that, for at least one plane normal to the rotation axis and situated under the set of at least one opening (advantageously between that set of at least one opening and the set of at least one deflector element), the flow rate of particles falling through a first angular sector in said plane and the apex of which is on the rotation axis is strictly higher than the flow rate of particles falling through a second angular sector in that plane and the apex of which is on the rotation axis, the first and second angular sectors having the same angle value and being separate.

For example, the set of at least one opening may be symmetrically distributed relative to a cylindrical hopper with a circular base, for example in the situation where the rotation axis is different from the axis of symmetry of the hopper. In particular, these two axes may be parallel. The flow rate of particles on one side of the rotation axis is higher than on the other side.

The hopper may for example have a non-circular profile, for example an elliptical or rectangular profile.

There may also be provided a hopper with a circular profile and a set of at least one opening having a set of at least one effective section conformed in an asymmetrical manner relative to the rotation axis so as to favor at least one direction of evacuation of particles relative to another.

The set of at least one opening may be defined in a lateral wall or walls of the hopper and/or in a bottom of the hopper.

For example there may be a plurality of openings of different sizes, comprising in particular openings larger on one side of the hopper than on the other side. Such asymmetry makes it possible to favor one or more directions of distribution of the particles at the expense of one or more others.

Also, by installing the distribution device in an eccentric manner relative to a vertical central axis of the vessel relatively homogeneous loading can be achieved. This eccentric installation can make it possible to free up space for other elements, for example probes. The invention therefore enables dense loading and compactness to be combined.

Moreover, by making it possible in this way to free up space at the center of the vessel, the invention is able to enable better monitoring of loading because it has proven that measurements effected by means of sensors positioned in a relatively central manner are more reliable than if the sensors are eccentric.

For example, there may be an opening that forms a strip, with a height varying according to the angular position on the wall of the hopper, so that the particles preferably fall in one or more directions, at the expense of one or more others.

In one embodiment, at least one opening may be adjusted individually, for example by means of a flap or otherwise. This can enable adjustment of the variations of flow rate with the angular position and therefore better adaptation to a chosen position in the vessel.

The set of at least one deflector element may define a plurality of axes of symmetry passing through the rotation axis and the rotation speed may be constant over at least one revolution.

However, the set of at least one deflector element may advantageously be such that when erected relative to the rotation axis the projections of said set in a plane normal to the rotation axis of the rotating member have an asymmetric distribution around said axis of rotation, defining at most one plane of symmetry passing through the rotation axis.

The drive member may advantageously be such that the rotating member to which it is coupled effects a movement with variations of angular speed over an angular range of 360° or less.

For example, the speed may be high over an angular range of less than 350° and low over the remaining range. Accordingly, during one revolution, the rate of rebounds (by an abuse of language the permeability to the particles of the deflector elements is referred to) can be modified, because the rebounds on these deflector elements depend on the speed of the deflector elements, which can make it possible to favor some distribution directions at the expense of others.

However, the drive member may advantageously be such that the rotating member to which it is coupled effects an oscillating movement with the rotation direction reversed at the ends of an angular range of 360° or less, advantageously 350° or less.

For example, the rotating member can therefore effect to-and-fro movements, going from one rotation direction to the opposite direction, over angular ranges of 350° or less, advantageously over 330° or less, advantageously over 320° or less, advantageously over 310° or less, advantageously over 270° or less.

Thus by combining a greater deflection angular range and rotation over a limited travel it is possible to favor the deviation directions corresponding to that angular range: by installing this device no longer on an axis of symmetry or central axis of the vessel, for example a reactor, but instead in an eccentric manner, it is possible to achieve reconciliation of uniform loading and smaller overall size. Space can therefore be freed up for the installation of other equipment, for example sensors.

In the prior art the deflection elements may comprise straps of semi-rigid material distributed in a regular manner over the circumference of a rotating shaft. The straps are of course separate elements, but if smoothing is effected, for example averaging over 20° or 30° (or more rigorously over 720° divided by the number of straps, for example over 120° in the case of 6 straps) of the straps when normal to the rotation axis, an isotropic distribution over 360° is achieved. The projections of the straps define two, three, four or more planes of symmetry.

With the device described hereinabove, when the deflector elements are erected relative to the rotation axis, their projections in a plane normal to the rotation axis do not define any plane of symmetry passing through the rotation axis or define only one.

In particular a lobed distribution can define a single plane of symmetry passing through the rotation axis or no plane of symmetry, depending on the shape of the lobe.

In one embodiment there may be a single deflector element.

That deflector element may extend 360° around the rotation axis with a length in the radial direction varying so as to define a greater deflection angular range. This deflector element could for example be made from a flexible or rigid material.

Alternatively, this single deflector element may extend over a restricted range, for example over 270°, over 180°, or over 60° or less. The length in the radial direction may either be identical over all this restricted range or vary.

In another embodiment, the set may comprise a plurality of deflector elements, which may be of different sizes.

Each deflector element may for example occupy an angular range between 1° and 30°, advantageously between 5° and 20°, for example of the order of 10°.

In one embodiment deflector elements may be provided over all the periphery of the rotating member but for example with the spacing between adjacent deflector elements, length and/or materials varying from one deflector element to another.

The deflector elements may be distributed over only a restricted angular range, for example a range extending over less than 320°, advantageously over less than 280°, 180° or 120°, but advantageously over more than 5°.

The deflector elements may optionally be regularly distributed within this restricted angular range, or not.

The deflector elements distributed over this restricted angular range may optionally be made of identical materials, or not.

The deflector elements distributed over this restricted angular range may optionally have a length (in the radial direction) which is identical or different.

The plurality of deflector elements may advantageously comprise at least one short deflector element and at least one long deflector element, each long deflector element having a length in the radial direction greater than the length of a short deflector element.

In one embodiment the plurality of deflector elements distributed only over the restricted angular range may comprise two short deflector elements at respective ends of that restricted angular range and at least one long deflector element between those two short deflector elements.

In another embodiment there may be between four and twelve deflector elements distributed over 360°. For example, the set of deflector elements may comprise deflector elements of varying length.

The invention is not limited to a particular form of deflector elements.

At least one deflector element may advantageously define with the rotating member an articulated connection so that this deflector element is able to go from a position for introduction into the vessel to a position erected relative to the rotation axis independently of the rotation of the rotating member.

In particular, the device may therefore comprise at least one linkage member cooperating with at least one deflector element so as to be able to cause that deflector element to go from the position for introduction into the vessel to the position erected relative to the rotation axis when a rod of that linkage member is actuated, for example pulled up or down.

For example, at least one deflector element may be made of a rigid material.

For example, a rigid deflector element may comprise a rigid rod defining with the rotating member an articulated connection so that this rigid deflector element is able to pass from a position for introduction into the vessel to a position erected relative to the rotation axis. This passage may optionally be effected merely because of the rotation, or not.

In the position for introduction into the vessel, the deflector element may be parallel to or slightly inclined relative to the rotation axis (forming with that axis an angle advantageously between 0 and 30° inclusive).

According to another example at least one deflector element may comprise a strap made of a flexible or semi-rigid material.

The straps may be made for example from rigid plastic, for example PVC (polyvinyl chloride), rubber, reinforced rubber, or other materials.

In particular, an aluminum core could be provided and a rubber covering or matrix.

The oscillating movement may advantageously be produced over an angular range of 360° or less, advantageously over 300° or less.

The to-and-fro movement may advantageously be periodic, i.e. identical for several seconds, advantageously for several minutes.

The period may be of the order of a few fractions of a second, for example one hundredth or one tenth of a second, or of the order of one second for example.

The drive member may advantageously be such that the angular speed of the rotating member represents at least 80% of its maximum at least 80% of the time, advantageously at least 90% or 95% of the time. The zero crossings are therefore relatively abrupt, which can be advantageous in the case of deflector elements erected by centrifugal force.

In a manner that is known in itself the distribution of the loaded particles is a function of the angular speed.

A relatively complicated oscillatory movement could also be employed, for example sweeping over an extended angular range in every period and sweeping of a circumscribed angular range in the extended angular range several times per period. Over a time lapse of several periods, the deflector elements are statistically present for longer in the circumscribed angular range.

The drive member may comprise a motor controlled to effect a movement with variations of angular speed over an angular range of 360° or less, for example an oscillating movement. The device may then comprise processing means, of microcontroller type for example, for controlling the motor.

The drive member may comprise a stepper motor for example.

The processing means for controlling the electric motor, for example a microcontroller or other means, may be programmed to control the electric motor so as to impose on it an oscillating movement.

These processing means may be carried on the motor or remain outside the reactor.

The invention is not limited to a particular form of processing means provided that they procure the to-and-fro movement described hereinabove.

In another embodiment the drive member may comprise a motor controlled to effect a continuous rotation movement, for example an electrical or other motor, and elements for converting the continuous rotation movement of the motor into a movement with variations of angular speed over an angular range of 360° or less, for example an oscillating movement limited to an angular range of 360° or less, advantageously 350° or less. These conversion elements may cooperate with the motor on the one hand and with the rotating member on the other hand. These conversion elements may for example comprise a roller, a cam and/or other movement conversion elements well known to the person skilled in the art cooperating with a shaft of the motor and with the rotating member.

In particular, the conversion elements may comprise an eccentric roller with an offset lug having at its end a pin positioned in an opening so as to transform the rotary movement into an oscillating movement, in the manner of a pendulum clock.

The drive member may comprise a pneumatic motor with a mechanical movement.

The rotation axis and the feed hopper may for example optionally be coaxial. In particular, in the case of a set of at least one asymmetric opening, there may be provided a rotation axis offset relative to the opening or openings of that set.

The distribution device may comprise a rotating shaft cooperating with or in one piece with the drive member and/or the rotating member.

That shaft may optionally be received in the feed hopper. There could for example be a feed hopper slightly offset relative to the shaft.

The deflector elements may optionally be fixed at different heights to one another, for example on a plurality of levels.

In the case of deflector elements distributed over a plurality of levels, a quincunx distribution could optionally be provided from one level to the other.

There is furthermore proposed an assembly comprising a vessel defining when placed on a horizontal floor a central vertical axis and a device as described hereinabove installed in said vessel at a location eccentric relative to said central vertical axis.

The vessel may be a reactor or other vessel.

The reactor may optionally be of chemical, electrochemical, petroleum or petrochemical type.

The reactor may be adapted to contain reagents and products during a catalytic reaction.

The vessel may have in its upper part an orifice of the same diameter as a maximum diameter of the vessel or advantageously of smaller diameter.

The maximum diameter of the vessel may be of the order of a few meters or alternatively of the order of one meter or less.

The diameter of the orifice may for example be of the order of a few meters, one meter or one decimeter. In the latter case, it may be particularly advantageous to provide a plurality of foldable rigid deflector elements.

There is further proposed a method for installation of a device for distribution of solid particles as described hereinabove in a vessel, for example a reactor, having an orifice in its upper part, in which method there is passed through said orifice at least the rotating member and the set of at least one deflector element at an eccentric position relative to a central axis of the vessel. Installation is effected via an orifice defined in the upper part of the vessel.

This orifice may in one embodiment have relatively small dimensions and may be eccentric.

The invention finally consists in a method of loading solid particles into a vessel comprising a central vertical axis, preferably a catalytic reactor. Said method comprises:
a) the installation in the vessel of a distribution device as described above via an opening of the vessel located in its upper part, preferably at a location eccentric relative to a central axis of the vessel; then
b) driving in rotation the rotating member of said device; and
c) loading particles by introducing them into the feed hopper of the device while the rotating member continues to rotate.

In accordance with one preferred embodiment, the rotating member effects an oscillating movement (that is to say a to-and-fro movement) with the rotation direction reversed at the ends of an angular range extending over 350° or less, preferably 330° or less, more preferably 320° or less, better 310° or less, and even better 270° or less.

In the present application the terms "high", "low", "upper", "lower", "vertical", "horizontal", "lateral", "above", "below", etc. are defined in the standard sense of those terms (that is to say the vertical direction is the direction of the gravity vector, that gravity vector being oriented downwards), for a vessel placed under normal conditions of use, that is to say with its longitudinal axis oriented in the direction of the gravity vector. Of course, the claimed subject matter can be oriented differently, in particular during its transportation.

As a general rule, in the present application by "one" is meant "one or more".

In particular, the invention can find an application in reactors with small dimensions, for example a height of a few tens of centimeters and with an opening a few centimeters in diameter. These reactors may be suitable for a catalytic reaction.

The invention is not limited to that application, however. For example a reactor could be several meters high and several meters in diameter.

BRIEF DESCRIPTION OF THE DRAWINGS

The invention will be better understood with reference to the figures, which show nonlimiting embodiments.

FIG. 6 is a sectional view in a vertical plane of a part of one example of an assembly in accordance with one embodiment of the invention.

DETAILED DESCRIPTION OF PARTICULAR EMBODIMENTS

Identical references may be used from one figure to the other to designate identical or similar elements.

Figure 1:
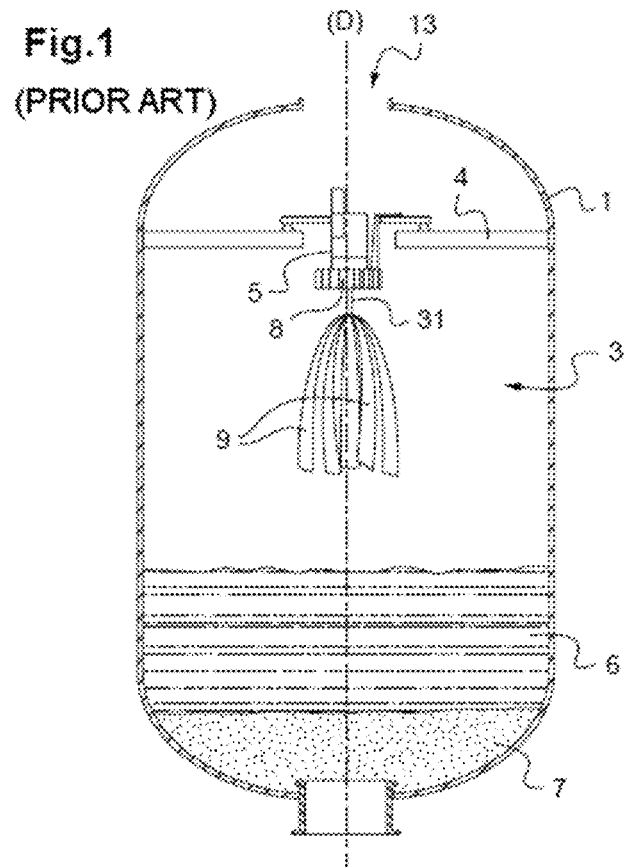
FIG. 1 represents diagrammatically an assembly comprising a reactor and one example of a prior art solid particle distribution device.

Referring to FIG. 1, a reactor 1 defines an opening 13, referred to as an orifice, for the passage in particular of a device 3 for distribution of solid particles 6, 7.

The distribution device 3 may for example be of the same type as that described in the document WO 2010/076522.

In the example represented the distribution device rests on a plate 4 of the reactor 1 on arms.

The device 3 further includes semi-rigid straps 9 for better distribution of the solid particles. These semi-rigid straps 9 are each fixed by one end to a shaft 31 extending along a vertical axis (D) through a hopper 5 for feeding solid particles 5.

This hopper may be connected to a store of solid particles, not shown, in a manner known in itself.

During loading solid particles flow through openings 8 defined at one end of the hopper, situated above the straps 9.

Also, the shaft 31 is driven in rotation by a motor, not represented, so that the straps extend away from the shaft at an angle.

Particles falling from the hopper 5 are liable to rebound on these straps and thus to be deviated from their trajectory. These somewhat random deviations can enable dense loading of solid particles.

The distribution device 3 enables loading of the reactor 1 with inert balls 6 and also with catalyst particles 7.

By products loaded into the reactor, or loading of the reactor, is meant solid particles distributed into the reactor by the distribution device, for example the beds 6, 7 from FIG. 1, the reagents and products in the chemical sense of the term, and/or otherwise.

Figure 2:
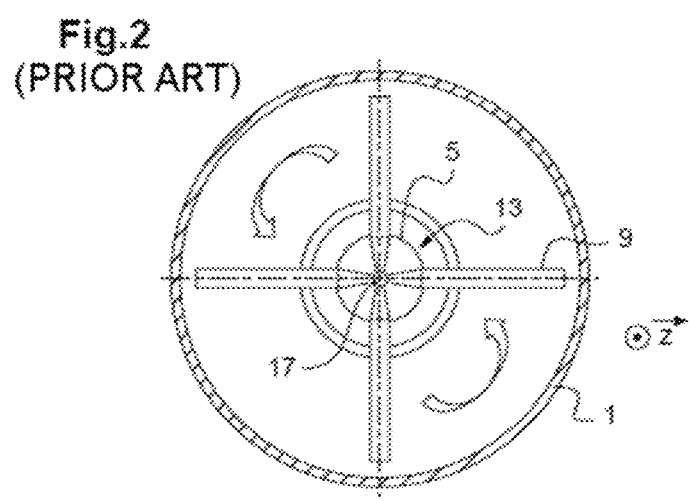
FIG. 2 is a diagrammatic view from below of one example of a prior art assembly when in motion.

Referring to FIG. 2, a solid particle distribution device of the type known from the prior art is represented installed in a reactor 1 via an opening 13 of that reactor.

This device comprises a hopper 5 crossed by a shaft 17 on its central axis.

This shaft 17 extends downwards beyond the hopper 5 and on an end part are mounted four identical straps distributed in a regular manner over the circumference of the shaft.

When as shown in FIG. 2 the shaft is driven in rotation the straps are erected relative to the shaft. The angular speed is constant at least over approximately ten revolutions, typically over relatively long time periods. The straps are therefore able to deviate a large quantity of solid particles, with no preferred direction because of the symmetry in the distribution of the blades and the absence of reversing of the rotation direction.

Figure 3:
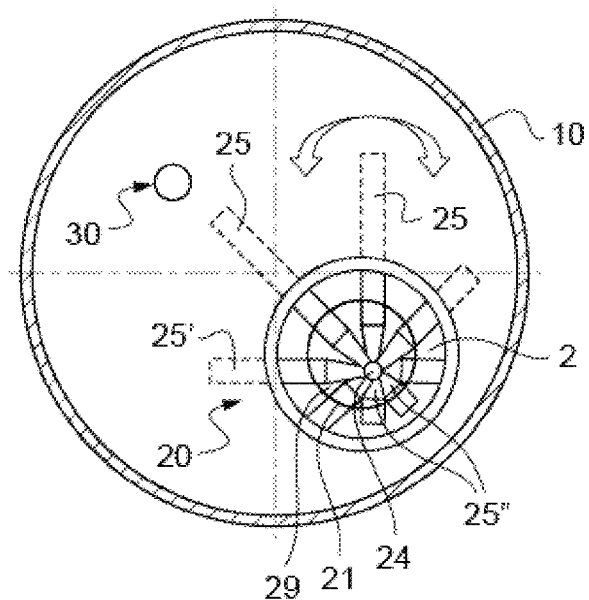
FIG. 3 is a diagrammatic view from above of one example of an assembly in accordance with one embodiment when in motion.

Referring to FIG. 3, there has been represented one example of a solid particle distribution device 20 in accordance with one embodiment when installed in a reactor 10 in accordance with a method in accordance with one embodiment of the invention.

This solid particle distribution device 20 comprises a hopper 21, for example 8 cm in diameter, received in an orifice 2 of the reactor, for example 10 or 12 centimeters in diameter.

The hopper 21 is crossed by a shaft 24 extending downwards beyond an opening 29 occupying the whole of the bottom of the cylindrical hopper 21 for the passage of solid particles (not represented) circulating in the hopper 21.

It can be seen that the shaft 24 and the hopper 21 are not concentric, the shaft 24 being eccentric relative to a central axis of symmetry of the hopper 21. Consequently the opening 29 is conformed in an asymmetric manner relative to this shaft 24 so that the flow rate of solid particles will be higher on one side of the shaft than on the other.

In this example eight straps 25, 25', 25" are mounted on this shaft 24.

In this example, each of these straps comprises an aluminum core (not represented) surrounded by a rubber sheath.

Each of the straps 25, 25', 25" is fixed by one end to the shaft 24 so as to form a pivot connection, the other end remaining free, so that the straps can be erected relative to the shaft when the latter is driven in motion.

Alternatively, the straps 25" being very short, they can be rigidly mounted on the shaft 24.

The set of straps is conformed so that their projections in a plane parallel to the plane of the sheet during a rotation movement are distributed in an asymmetric manner around the axis of the shaft 24, i.e. it is not possible to distinct planes of symmetry passing through this shaft.

In this embodiment the straps are distributed at 360°.

In an embodiment that is not represented the straps are circumscribed in an angular range extending over almost 90° and there are no straps over the angular range symmetrical thereto relative to the rotation axis.

The shaft 24 is driven in an oscillating movement, changing rotation direction after a travel of 240° for example.

The shaft 24 is installed in an eccentric manner relative to a central axis of the reactor, thus enabling space to be freed up for installing other devices 30.

The shaft 24 is initially oriented so that the planes it crosses at zero speed are either side of the vertical plane passing through the central axis of the reactor and through the shaft, at similar or equal distances: accordingly, during the oscillating movement, this vertical plane is often crossed by at least one relatively long strap 25, 25', which favors deviation toward the center of the reactor and the part of the wall of the reactor farther from the device 20. Relatively dense loading of the reactor can therefore be achieved.

It may be noted that in this example not all the straps of the same length (in the radial direction, when in rapid motion), the straps 25 being shorter than the straps 25' and the straps 25" near the wall of the reactor being even shorter than the straps 25'.

Figure 4:
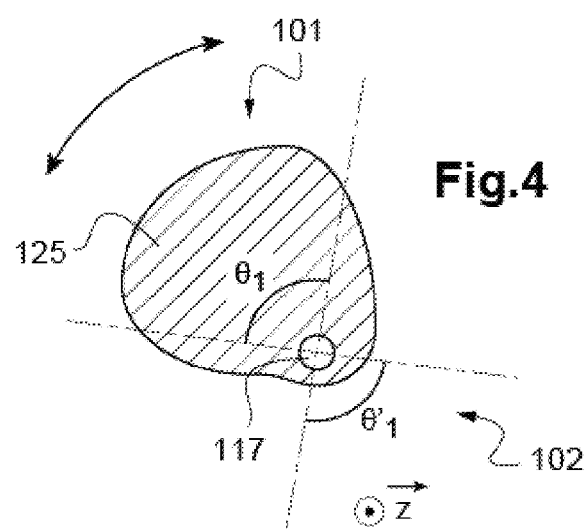
FIG. 4 is a diagrammatic sectional view of one example of a solid particle distribution device in accordance with another embodiment when in motion.

In the FIG. 4 embodiment there is only one deflector element 125, produced from a layer of very flexible material, of slightly or hardly circular shape, installed around the shaft 117 in the manner of an eccentric.

The area of this deflector element, when erected around the shaft or when flat, over a first angular sector 101 corresponding to the angle of θ1, is much higher than the area of this deflector element over a second angle sector 102 symmetrical to the sector 101 relative to the axis of the shaft 117 (and corresponding to the angle θ1' and therefore of equal value to θ1).

By applying an oscillating movement and preferably by tipping the particles onto the angular sector 101 it is therefore possible to break up the isotropic nature of the deviation of the particles and to alleviate the lack of symmetry caused by an eccentric position relative to the central axis of a reactor.

Figure 5:
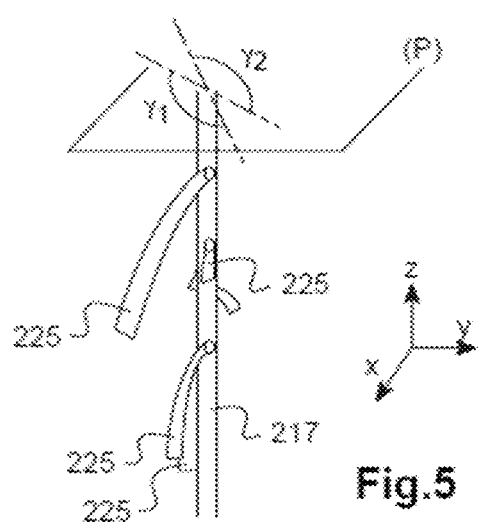
FIG. 5 is a diagrammatic perspective view of a part of one example of a solid particle distribution device in accordance with another embodiment, when stopped or rotating at a low speed.

In FIG. 5 embodiment the straps 225 are disposed at diverse heights and have different lengths.

In the case of rapid movement the projections of the straps in a plane (P) normal to the rotation axis corresponds to a larger area than in an angular sector tied to the shaft having an angle φ1 than in the symmetrical angular sector extending over an angle φ2=φ1.

There has been represented in FIG. 6 a top part of an assembly in accordance with one embodiment comprising a reactor, of which only a part 311 is shown, a solid particle distribution device and a thermocouple 318.

The thermocouple 318 is fastened to a cover 312 covering the upper opening of the reactor.

This cover 312 defines a passage into which may be introduced a hopper lower part 306 of small diameter fastened to an upper part 305 of greater diameter.

This passage may for example have a diameter of the order of ten centimeters, for 12 centimeters.

The reactor may have for example a diameter of 60 centimeters and define a volume of close to 5 cubic meters.

Thanks to this cover 312, leaks and damage caused by dust are prevented and moreover, in that it is no longer necessary to open the reactor, preparation times are reduced.

Passed through the hopper is a shaft 317 connected to an alternating movement motor 307 and to rigid plastic straps 325 mounted on and articulated to the shaft 317.

The hopper 305, 306 is installed offset relative to a central axis of the opening of the reactor.

These straps 325 are not distributed over 360° around the rotation axis of the shaft 317 but instead over a limited angular portion, for example of less than 60°.

A distribution device is installed in the reactor so that the straps are oriented at least broadly speaking toward the center of the reactor.

The hopper 306 is filled with catalyst (not represented) that flows via openings not shown mostly above the straps 325.

The motor 307 is controlled by a microcontroller that is not represented programmed to import an oscillating movement to the shaft 317 fastened to the rotor of the motor 307.

There may be provided for example between 50 and 500 periods per second, for example 100 or 200 periods per second.

Figure 7A:
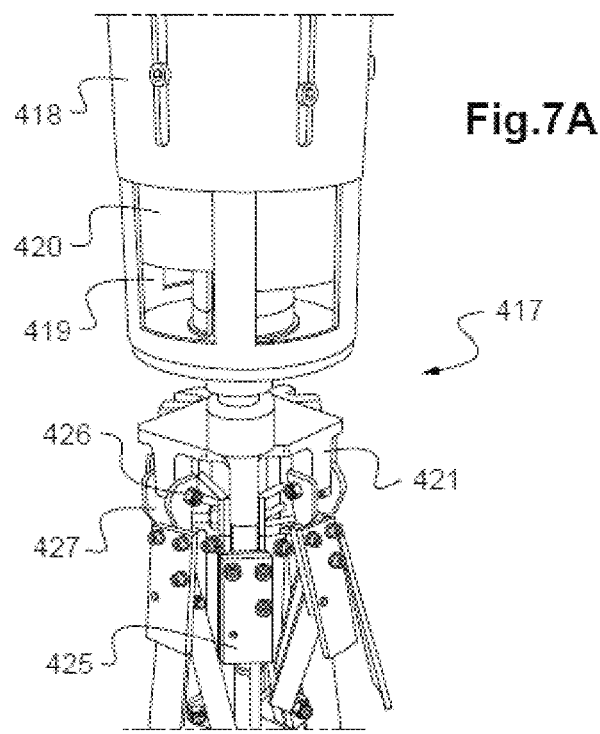
FIG. 7A is a diagrammatic perspective view of a part of one example of a solid particle distribution device in accordance with another embodiment with the deflector elements in the position for introduction into the vessel.
Figure 7B:
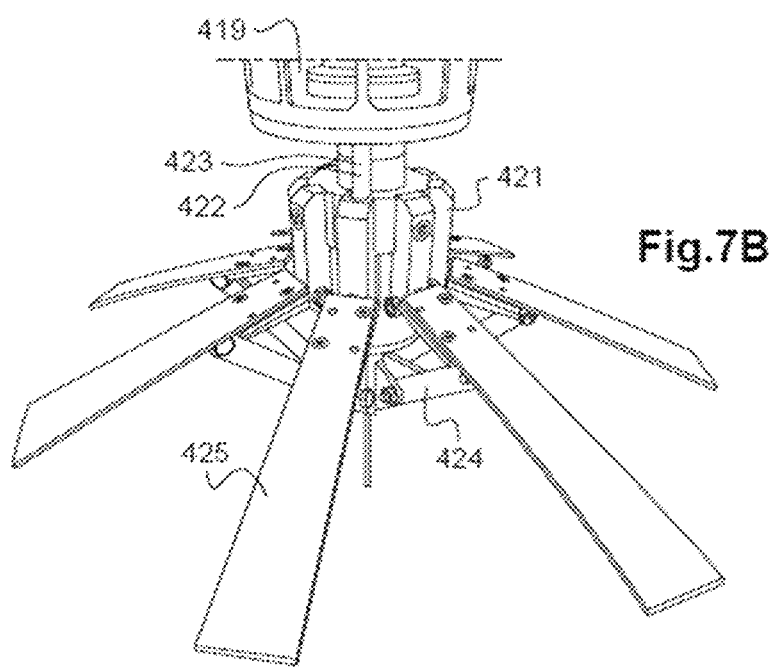
FIG. 7B is a diagrammatic perspective view of a part of the example of a solid particle distribution device from FIG. 7A when stopped or rotating at a low speed.

In the embodiment from FIGS. 7A and 7B the distribution device 417 comprises a hopper 418 defining a plurality of, here four, lateral openings 419.

In this example each opening 419 is equipped with a blocking flap 420 mounted on and sliding on vertical rails. The effective section of each opening 419 can therefore be adjusted so that the set of openings 419 can be distributed in an asymmetric manner over the periphery of the hopper so as to favor the evacuation of the particles contained in the hopper in certain directions.

Under these openings 418 rigid plastic deflector elements 425 are mounted on a rotating element 421.

That rotating element 421 cooperates via conversion means with no reference symbol with a shaft crossing the hopper positioned in a central manner relative to the hopper and driven in rotation by a motor that is not represented.

These conversion means, comprising in particular a roller, enable transformation of the continuous rotation movement of the shaft into an oscillating movement of the rotating element 421.

An articulation at the end of each deflector element 425 defines a pivot connection between that reflector element and the rotating element 421.

To be more precise, two flanges 427 facing one another are fastened by screws to the deflector element. These flanges 427 define orifices to receive a rod 426 passing through a bore defined in the rotating element 421.

Thanks to this pivot connection the deflector elements 425 are therefore able to pass from a position for introduction into the vessel, as shown in FIG. 7A, to a deployed position, as shown in FIG. 7B.

In this embodiment, this passage from one position to the other is effected by means of a linkage member 422. This member comprises a plurality of rods articulated to one another, including a central vertical rod 423 and radial rods 424. The radial rods 424 are articulated to the deflector elements 245 and the linkage member 422 is such that a vertical movement of the central rod 423 drives in movement the radial rods 424 and therefore the deflector elements 425, in the manner of an umbrella.

Thus the deflector elements installed in the vessel may be erected before starting the motor.

The influence of the rotation speed on the angle of the deflector elements can therefore be reduced, and possibly zero. The rotation speed can therefore affect the permeability to particles independently of this angle between the rotation axis and the longitudinal direction tied to a deflector element.

The linkage member may advantageously be conformed so that the angular position of at least one deflector element (for example all of the deflector elements or each deflector element individually) may be adjustable.

It has proven that this device, with its asymmetries, offers relatively high performance in terms of loading.

In fact, the Applicant has simulated in a relatively satisfactory manner the loading density as a function of a certain number of parameters, including the dimensions of the vessel, the rotation speed, the dimensions of the deflector elements, the size of the particles, the weight of the particles, the mass of all the particles loaded, etc. If such simulations are effected before tests carried out with a distribution device of the same type as that from FIG. 1, the experimental results agree with the results obtained by simulation.

A simulation and a test have been carried out using the distribution device from FIG. 7B, the simulation being effected in accordance with the known simulation method and with values of parameters (dimensions of the vessel), average length of the deflector elements, width of the deflector elements, etc.) corresponding to the actual test values. A loading density much greater than the simulated density is surprisingly achieved. The simulated and expected density was 1.462 ton per cubic meter, whereas the experiment resulted in a density of 1.505 ton per cubic meter, that is to say an increase of almost 15%, when the distribution device occupied an eccentric position in the vessel.

Figure 8:
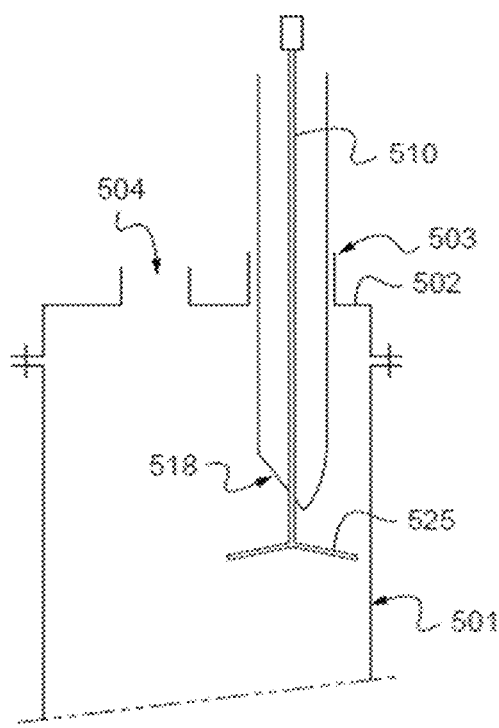
FIG. 8 is a highly diagrammatic view of a part of one example of a solid particle distribution device in accordance with another embodiment, when stopped or rotating at a low speed.

Referring to FIG. 8, there has been represented an example of the distribution device in accordance with another embodiment in which the deflector elements 525 are all the same length and are driven in a continuous rotation movement at constant speed while the hopper defines an opening 518 asymmetric relative to the rotation axis of the shaft 510. The grains of catalyst are therefore mostly discharged toward the center of the vessel, the deflector elements enabling relative homogeneity to be obtained.

It may be noted that the vessel 501 is closed at the top by a cover 502 defining a small number of offtakes, here two offtakes 503, 504. One offtake 503 corresponds to the passage of the distribution device while the other offtake 504 may correspond to the passage of a probe or other device.

What is claimed is:

1. A device for distribution of solid particles when loading a vessel with said particles, comprising:
    a solid particle feed hopper defining a set of at least one opening for evacuation of the particles from the hopper by gravity,
    a rotating member and a drive member coupled to said rotating member to drive said rotating member in rotation about a rotation axis having a vertical direction,
    downstream of the set of at least one opening of the feed hopper a set of at least one deflector element carried by said rotating member erected relative to the rotation axis or adapted to be erected relative to the rotation axis,
    characterized in that the set of at least one opening in the feed hopper is conformed in an asymmetric manner relative to the rotation axis, defining at most one plane of symmetry passing through the rotation axis.

2. The device of claim 1, in which the set of at least one deflector element is such that when erected relative to the rotation axis, projections of said set in a plane normal to the rotation axis of the rotating member have an asymmetric distribution around said rotation axis, defining at most one plane of symmetry passing through the rotation axis.

3. The device of claim 1, in which the drive member is such that the rotating member to which it is coupled effects an oscillating movement with a rotation direction reversed at the ends of an angular range extended over at most 350°.

4. The device of claim 1, in which at least one deflector element of the set of at least one deflector element defines with the rotating member an articulated connection so that this deflector element is set from a position for introduction into the vessel to a position erected relative to the rotation axis independently of the rotation of the rotating member.

5. The device of claim 4, further comprising at least one linkage member cooperating with at least one deflector element so as to be able to cause that deflector element to move from the position for introduction into the vessel to the position erected relative to the rotation axis when a rod of the linkage member is actuated.

6. The device of claim 1, comprising a plurality of deflector elements of different sizes.

7. The device of claim 1, in which the deflector elements are distributed over an angular range from more than 5° to less than 320°.

8. The device of claim 1, in which the set of at least one opening of the feed hopper comprises a plurality of openings of different sizes, including openings of greater size on one side of the hopper than on the other side.

9. A method for installation of the device of claim 1 in a vessel having an orifice in an upper part of said vessel in which there are caused to pass through said orifice at least the rotating member and the set of at least one deflector element at an eccentric position relative to a central axis of the vessel.

10. An assembly comprising a vessel defining a central vertical axis and the device of claim 1 installed in said vessel via an opening of said vessel defined in an upper part of said vessel at an eccentric location relative to said central axis.

11. The assembly of claim 10 in which the vessel is a catalytic reaction reactor.

12. A method of loading solid particles into a vessel comprising a central vertical axis, comprising:
 a) the installation in the vessel of the device of claim 1 via an opening of the vessel located in an upper part; then
 b) driving in rotation the rotating member of said device; and
 c) loading particles by introducing them into the feed hopper of said device while the rotating member continues to rotate.

13. The method of claim 12, characterized in that the rotating member effects an oscillating movement with a rotation direction reversed at the ends of an angular range extending over 350° or less.

14. The method of claim 12, wherein in step a) said device is installed at a location eccentric relative to the central axis of the vessel.

* * * * *